United States Patent [19]

Rae-Smith

[11] Patent Number: 4,652,921
[45] Date of Patent: Mar. 24, 1987

[54] IMAGE PROCESSING APPARATUS

[75] Inventor: Adam R. Rae-Smith, Newbury, Great Britain

[73] Assignee: Quantel Limited, Kenley, Great Britain

[21] Appl. No.: 757,782

[22] Filed: Jul. 22, 1985

[30] Foreign Application Priority Data

Jul. 27, 1984 [GB] United Kingdom ............... 8419291

[51] Int. Cl.$^4$ .................. H04N 5/14; H04N 5/32
[52] U.S. Cl. ............................ 358/160; 358/111; 358/166; 378/99; 360/33.1; 360/31
[58] Field of Search ............... 358/160, 167, 36, 37, 358/111, 148, 166; 378/99; 360/27, 33.1, 31

[56] References Cited

U.S. PATENT DOCUMENTS 4,551,800 11/1985 Riederer et al. .................. 358/111
4,577,240 3/1986 Hedberg et al. .................. 360/31

Primary Examiner—James J. Groody
Assistant Examiner—Michael D. Parker
Attorney, Agent, or Firm—Cooper, Dunham, Griffin & Moran

[57] ABSTRACT

Video signals from radiography equipment (14) are converted to digital form and transferred via a buffer store, (2) to a parallel transfer disc store (3) in real time. These signals can then be read, out again in real time, to a video processor (6) and frame store (8) to provide image enhancement. The enhanced image can then be converted to analog form and displayed on display means (13). The parallel transfer mode of operation of the disc store (3) enables the video signals to be stored in real time. A computer (7) provides control signals to the system.

7 Claims, 2 Drawing Figures

IMAGE PROCESSING APPARATUS

This invention relates to improvements in image processing apparatus for pictures obtained from radiography equipment.

BACKGROUND OF THE INVENTION

Description of Related Art

This image processing apparatus is used to produce clearer pictures from radiography equipment so that a doctor has the information needed for a diagnosis. A known form of this apparatus comprises an image processor in which integrated frames of video information from radiography equipment are stored on discs at a maximum rate of three pictures per second. These input signals are obtained continuously over a period of time, at some point in which a radio-opaque dye is introduced into the patient. Once the dye has passed through the part of the patient which is of interest the recorded pictures can be processed in such a way as to show clearly the part affected by the dye. In order to achieve this two frames of video information are taken from the disc store, one before the dye was introduced and one after, and subtracted. This removes the background and leaves the part with the dye clearly visible. An improvement in the signal-to-noise ratio in the processed pictures can be brought about by taking the sum of the clearest pictures before and after the dye has been introduced and subtracting the two sums, or by summing a continuous sequence using a weighted co-efficient scheme.

One problem with this system is the slow rate of storage on the disc store. This severely limits the amount of information that can be obtained from rapidly moving structures, such as the heart where the local motion of the heart wall is of importance in diagnosis.

SUMMARY OF THE INVENTION

An object of the present invention is to overcome this problem by utilizing a parallel transfer disc in order to increase the rate of video storage.

According to the present invention there is provided an image processor for video signals from radiography equipment comprising:
  parallel transfer disc means for storing frames of video signals,
  a buffer store for storing frames of video signals,
  a frame store for storing frames of video signals,
  a video signal processor,
  control means operative to transfer video signals from the radiographic equipment via said buffer store to said disc means in a frame period and operative subsequently to transfer video signals, via said buffer store, from said disc means to said video signal processor in a frame period and to include said processor in a recursive circuit with said frame store, to thereby cause the storage of selectively processed video signal in the frame store;
  and means for displaying the processed video signals stored in said frame store.

Preferably the control means includes a computer having a keyboard and/or a graphics tablet so that different modes of operation of said signal processor can be selected. For example the signal processor may be arranged to add or subtract the signals received respectively from the buffer store and the frame store, or proportions of such signals.

Preferably also the control means may include means for recording an electrocardiograph output while receiving video signals from the radiographic equipment so as to provide a timing reference signal which can be used during signal processing for synchronizing the appropriate recorded video frames.

Each frame of the video signals from the radiographic equipment is transferred, in the apparatus according to the invention, in real time to the disc means and is subsequently transferred in real time from the disc means to the video signal processor. Since the signals are derived from radiographic equipment, only luminance information is significant and this assists in enabling the pixel rates to be maintained within the capacity of the disc means. The average pixel rate can also be reduced, by discarding pixels from the beginning and end of each line of video signals, in which there is unlikely to be significant information.

One example of the invention will now be discussed with reference to the accompanying drawings.

DESCRIPTION OF THE PREFERRED EMBODIMENT

Figure 1:
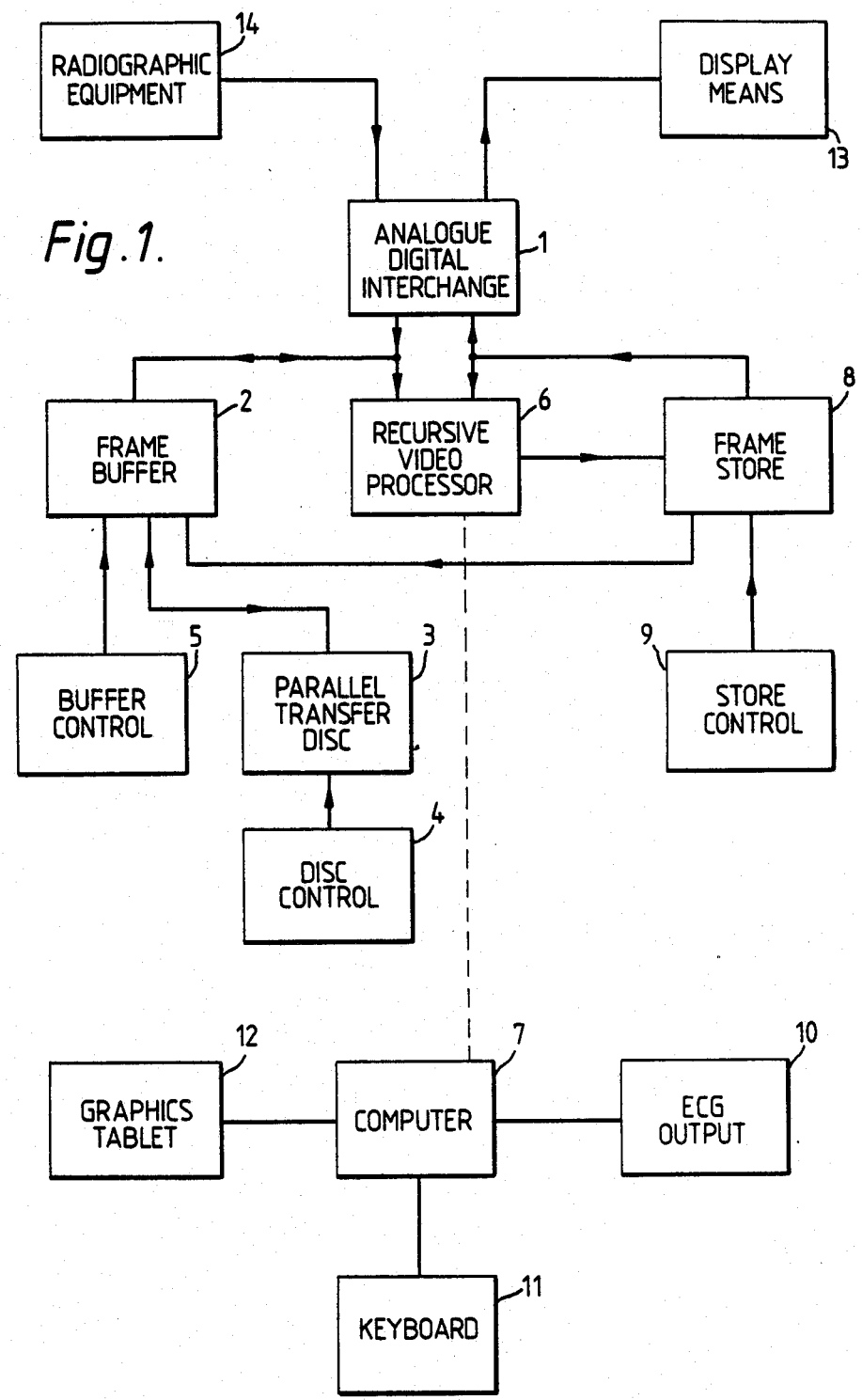
FIG. 1 shows exemplary apparatus embodying the invention.
Figure 2:
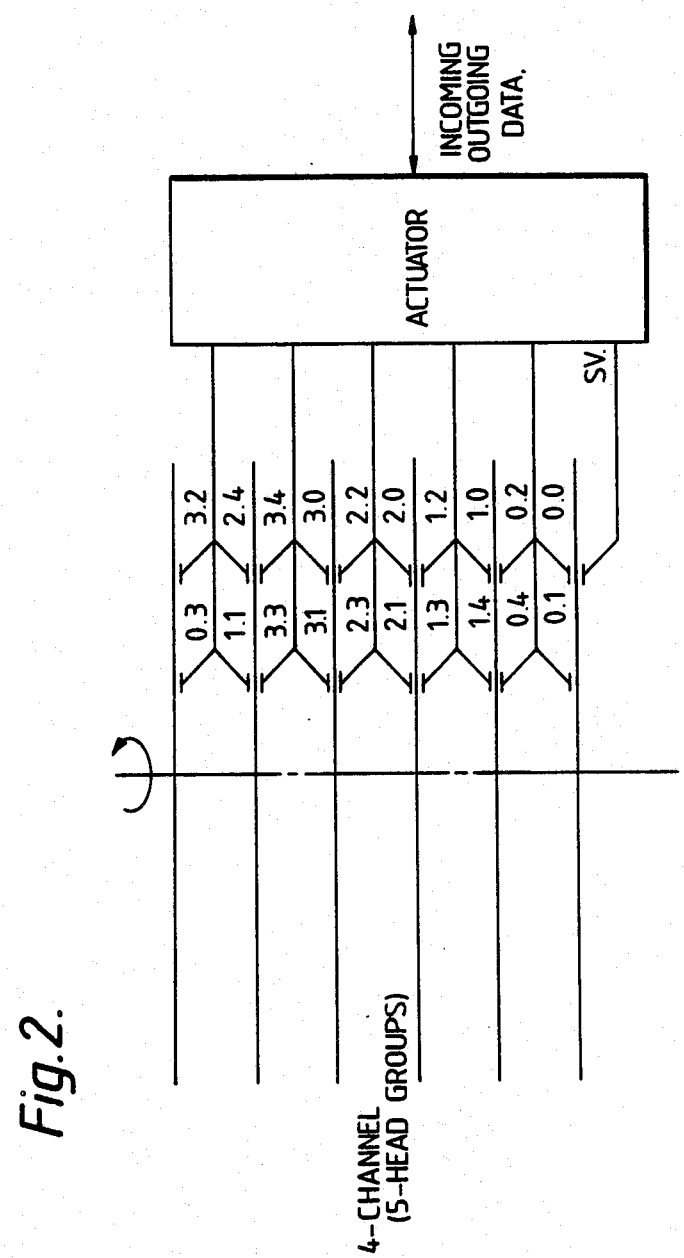
FIG. 2 shows a diagram of a action of the parallel transfer disc.

Video signals, derived from the radiography equipment 14 and representative of an image of a patient, are converted into digital form in the analog-to-digital converter 1. The digital video frames are then stored in the frame store buffer 2 prior to real time transfer onto the parallel transfer disc 3 in response to the disc controller 4. The storage onto the disc can be done at the frame rate of the system i.e. 30 frames/second for USA and 25 frames/second for Europe. The parallel transfer disc is able to store information at a much increased rate over the prior art apparatus as it can read and write information onto each of the platters of the disc simultaneously via parallel heads. This can be seen in FIG. 2. These discs are known items of commerce, one example of which is Fujitsu M2350A Parallel Transfer Disc. The required length of time of video frames are recorded in this way and are available for processing.

The disc store writes or reads information at a faster rate than the frame store but there are periods when the information cannot be transferred to the disc. The buffer store 2 stores the video signals so that the transfer can be achieved at the correct rate to and from the disc.

The control means control the transference of the video output from the radiographic equipment via the buffer store 2 to the disc 3 and from the disc 3, via the buffer store to the recursive video processor 6, said control means also controlling the processing of video signals (a connection is illustrated between computer 7 and video processor 6). The video signals are processed at video rates using the recursive video processor 6 and the computer means 7 in response to keyboard 11 and graphics tablet 12 control. The recursive video processor 6 is able to sum or substract various proportions of video signals from the buffer store 2 and frame store 8, and a suitable example of a frame store is used in the equipment available from the assignee of this application under the commercial designation DPB 7000. The frame store control means 9 are known items of commerce, one example of which is used in the apparatus available from the assignee of this application under the commercial designation CRYSTAL apparatus. The pictures are processed as before to remove the background and leave only the part of interest and can be viewed in analog form on display device 13. For cardiac work the recorded electrocardiograph information from ECG output 10 is used to select images which occur at the same phase of the heart cycle. The computer means 7 is used to analyze the pictures to provide further information for diagnosis.

An improvement in the signal-to-noise ratio of the final image can be achieved as before by selecting the clearest pictures before and after the dye is added and summing. All these processes are done in response to the keyboard and graphics tablet controls.

It is to be understood that this invention has other uses than for cardiac work alone.

I claim:

1. An image processor for video signals from radiography equipment comprising:
   parallel transfer disc means for storing frames of video signals;
   buffer store means for storing frames of video signals;
   frame store means for storing frames of video signals;
   a video signal processor;
   control means operative to transfer video signals from the radiography equipment, via said buffer store means, to said disc means in a frame period and operative subsequently to transfer said video signals from the disc means, via said buffer store means, to said signal processor in a frame period and to include said processor in a recursive circuit with said frame store means, to thereby cause the frame store means to store selectively processed video signals;
   and means for displaying the processed video signals stored in said frame store means.

2. A system as in claim 1, wherein said control means includes a computer having a graphics tablet input.

3. A system as in claim 2, wherein a graphics tablet ouputs a signal to said computer, said signal controlling the processing in said processor.

4. A system as in claim 1, wherein said control means includes means for recording an electrocardiograph output while said video signals are received for generating therefrom an output providing a reference timing signal for synchronizing selected video frames.

5. An image processor for video signals from radiography equipment comprising:
   a frame buffer, a parallel transfer disc and a frame store, each capable of storing at least a frame of said video signals;
   a video processor capable of processing frames of said video signals;
   a control circuit causing the transfer of selected frames of said video signals from the radiography equipment to the frame buffer and from the frame buffer to the parallel transfer disc, wherein each frame is transferred from the frame buffer to the parallel disc store within a frame period, causing the subsequent transfer of selected frames of said video signals from the parallel transfer disc to the frame buffer and from the frame buffer to the video processor, wherein each frame is transferred from the parallel disc store to the frame buffer within a frame period, and causing the video processor to combine one or more selected frames received thereby from the parallel transfer disc with one or more selected frames stored in the frame store and to store the result in the frame store as a processed frame; and
   a display for displaying the processed frame stored in the frame store.

6. An image processor as in claim 5 in which the video processor and the frame store are connected in a recursive circuit.

7. An image processor as in claim 6 in which the control circuit selectively causes the video processor to algebraically sum selected proportions of frames of video signals from the buffer store and the frame store and to store the result in the frame store as said processed frame.

* * * * *